United States Patent

Shiraishi et al.

[11] Patent Number: 4,665,312
[45] Date of Patent: May 12, 1987

[54] SIGNAL DETECTING METHOD IN AUTORADIOGRAPHY

[75] Inventors: Hisashi Shiraishi, Minami-ashigara; Tsutomu Kimura; Kazuhiro Hishinuma, both of Kanagawa, all of Japan

[73] Assignee: Fuji Photo Film Co., Ltd., Japan

[21] Appl. No.: 773,858

[22] Filed: Sep. 9, 1985

Related U.S. Application Data

[63] Continuation of Ser. No. 595,479, Mar. 30, 1984, abandoned.

[30] Foreign Application Priority Data

Mar. 31, 1983 [JP] Japan ................................. 58-57417

[51] Int. Cl.⁴ ............................................. G01T 1/20
[52] U.S. Cl. ................................ 250/303; 250/327.2; 250/484.1
[58] Field of Search ................. 250/484.1, 327.2, 303

[56] References Cited

U.S. PATENT DOCUMENTS

| | | | |
|---|---|---|---|
| 4,389,670 | 6/1983 | Davidson et al. | 250/363 R |
| 4,464,682 | 8/1984 | Etoh et al. | 358/288 |
| 4,494,004 | 1/1985 | Mauer, IV et al. | 250/398 |
| 4,498,006 | 2/1985 | Horikawa et al. | 250/327.2 |

Primary Examiner—Carolyn E. Fields
Attorney, Agent, or Firm—Gerald J. Ferguson, Jr.; Michael P. Hoffman; Ronni S. Malamud

[57] ABSTRACT

A signal detecting method in autoradiography, which is applied to an autoradiography having locational information on radioactively labeled substances such as radioactively labeled biopolymers distributed one-dimensionally, being recorded on a stimulable phosphor sheet as a radiation energy-stored image, which comprises steps of:

(1) preliminarily scanning a part of the stimulable phosphor sheet with an electromagnetic wave to release a portion of the radiation energy as stimulated emission and detecting the stimulated emission to give an electric signal, to which a signal processing is applied, to determine one-dimensional distribution direction of the radioactively labeled substances; and (2) finally scanning the stimulable phosphor sheet with an electromagnetic wave along said one-dimensional distribution direction to release the radiation energy as stimulated emission and detecting the stimulated emission, to obtain the locational information on the radioactively labeled substances as a digital signal.

7 Claims, 3 Drawing Figures

SIGNAL DETECTING METHOD IN AUTORADIOGRAPHY

This application is a continuation of Ser. No. 595,479, filed Mar. 30, 1984, now abandoned.

BACKGROUND OF THE INVENTION

1. Field of the Invention

This invention relates to a signal detecting method in autoradiography.

2. Description of the Prior Art

Autoradiography has been known as a method for obtaining locational information on radioactively labeled substances distributed in at least one-dimensional direction to form a row or rows on a support medium.

For instance, the autoradiography comprises steps of: labeling organism-originating biopolymers such as proteins or nucleic acids with a radioactive element; resolving the radioactively labeled biopolymers, derivatives thereof, or cleavage products thereof (referred to hereafter as "radioactively labeled substances") on a gel support (support medium) through a resolving process such as electrophoresis to form a resolved pattern of the radioactively labeled substances (the resolved pattern is not visible); placing said gel support and a high-sensitivity type X-ray film together in layers for a certain period of time to expose said film and developing said film to give the autoradiograph of the resolved pattern as a visible image on the film; and obtaining the locational information on the radioactively labeled substances from said visible image. Further, the identification of the polymeric substances, determination of molecular weight of the polymeric substances and isolation of the polymeric substances can be performed based on the obtained locational information. The autoradiography has been effectively utilized for determining the base sequence of nucleic acids such as DNA.

Instead of the conventional radiography using a radiographic film which is utilized in the above-mentioned autoradiography, an autoradiographic process which utilizes a radiation image recording and reproducing method using a stimulable phosphor sheet is described in Japanese Patent Application No. 57(1982)-193418 (the content of which is disclosed in U.S. patent application Ser. No. 549,417, now abandoned, and European patent application No. 83110984.8).

The radiation image recording and reproducing method comprises steps of: placing a sample on a stimulable phosphor sheet to cause the stimulable phosphor sheet to absorb radiation energy having radiated from the sample; scanning the stimulable phosphor sheet with an electromagnetic wave such as visible light or infrared rays (hereinafter referred to as "stimulating rays") to sequentially release the radiation energy stored in the stimulable phosphor sheet as emission (stimulated emission); photoelectrically detecting the emitted light to give an electric signal; and converting the electric signal to a digital signal through A/D conversion.

The stimulable phosphor sheet used for the radiation image recording and reproducing method contains a stimulable phosphor such as a divalent europium activated alkaline earth metal fluorohalide phosphor. When exposed to a radiation such as X-rays, $\alpha$-rays, $\beta$-rays, $\gamma$-rays, or ultraviolet rays, the stimulable phosphor stores a portion of the radiation energy and then emits light corresponding to the radiation energy stored therein upon excitation with an electromagnetic wave (stimulating rays) such as visible light or infrared rays after exposure to the radiation.

The autoradiography utilizing the above-mentioned radiation image recording and reproducing method is free from various limitations on the measuring conditions which are required in the autoradiography utilizing the conventional radiography, and accordingly the autoradiographic process can be noticeably simplified. Further, the locational information on the radioactively labeled substances can be obtained as an electric signal and/or digital signal without visualizing an autoradiograph having the locational information thereof, so that it is possible to improve the accuracy of determination of the locational information and to increase the amount of the information.

A digital signal processing method for obtaining information on one-dimensional location of radioactively labeled substances in the form of symbol and/or numeral in the autoradiography utilizing the radiation image recording and reproducing method is described, for instance, in Japanese Patent Application No. 58(1983)-1326 (the content of which is disclosed in U.S. patent application Ser. No. 568,877, now abandoned, and European patent application No. 84100144.9). Said signal processing method comprises steps of: determining a one-dimensional scanning line (namely one-dimensional distribution direction of the radioactively labeled substances) for signal processing with respect to the obtained digital signal; and detecting sampling points on the scanning line. The term "scanning" in this method means the numeral scanning on the digital image data.

According to the above-mentioned signal processing method, the information on one-dimensional location of the radioactively labeled substances, which has been relied on the visual judgment of investigators in the conventional art, can be obtained automatically and accurately in the desired form such as symbol and/or numeral. Consequently, the signal processing method brings about an improvement of the accuracy of locational information and increase of the amount of information.

Another signal processing method in the autoradiography utilizing the radiation image recording and reproducing method, which comprises determining the scanning line for detecting sampling points with respect to the obtained digital signal, is described in Japanese patent application No. 58(1983)-1328 (the content of which is disclosed in U.S. patent application Ser. No. 568,906 and European patent application No. 84100150.6).

In any signal processing method described above, the one-dimensional distribution direction (scanning line on the digital image data for detecting sampling points) of the radioactively labeled substances is determined, after the digital signal corresponding to the autoradiograph having the locational information on the radioactively labeled substances is obtained by photoelectrically detecting (reading out) the stimulable phosphor sheet on which the autoradiograph is recorded. Therefore, the obtained digital signal is initially stored in a memory of a signal processing circuit and subsequently the digital signal are selectively taken out of the memory according to the signal processing operation, so as to determine the one-dimensional distribution direction of the radioactively labeled substances.

More in detail, the read-out of the stimulable phosphor sheet is carried out over its entire surface and the digital image data are inevitably obtained even on an vacant area of th sheet which does not give any locational information on the radioactively labeled substances. That is, all of the digital signal which is obtained by detecting on the entire surface of the stimulable phosphor sheet should be temporarily stored in the memory of the signal processing circuit, and thus the memory requires a great capacity for storing it.

Additionally, the photoelectrical read-out operation on the stimulable phosphor sheet requires not a short period of time, because the operation should be carried out over the entire surface thereof.

SUMMARY OF THE INVENTION

Accordingly, an object of the present invention is to provide a signal detecting method in autoradiography for efficiently detecting a digital signal having the locational information on radioactively labeled substances.

The object can be accomplished by preliminarily scanning with an electromagnetic wave a part of the stimulable phosphor sheet on which an autoradiograph having the information on one-dimensional location of the radioactively labeled substances is recorded, to determine one-dimensional distribution direction of the radioactively labeled substances; and subsequently scanning with an electromagnetic wave the same stimulable phosphor sheet along said one-dimensional distribution direction to obtain the locational information on the radioactively labeled substances as a digital signal.

That is, the present invention provides a signal detecting method in autoradiography, which is applied to an autoradiograph having locational information on radioactively labeled substances distributed one-dimensionally, being recorded on a stimulable phosphor sheet as a radiation energy-stored image, which comprises steps of:

(1) scanning the stimulable phosphor sheet with an electromagnetic wave in at least two different positions in such a manner that each scanning traverses the onedimensional distribution of the radioactively labeled substances to release a portion of the radiation energy of the autoradiograph as stimulated emission and photoelectrically detecting the stimulated emission to give an electric signal, to which is applied a signal processing comprising stages of:

detecting distribution points of the radioactively labeled substances for each scanning, and preparing a continuous line selected from the group consisting of a straight line, a polygonal line and a curved line along the corresponding distribution points of the radioactively labeled substances for each scanning to assign said continuous line to one-dimensional distribution direction of the radioactively labeled substances; and (2) scanning the stimulable phosphor sheet with an electromagnetic wave along said one-dimensional distribution direction of the radioactively labeled substances determined in the step (1) to release the radiation energy of the autoradiograph as stimulated emission and photoelectrically detecting the stimulated emission, to obtain the locational information on the radioactively labeled substances indicated by said autoradiograph as a digital signal.

In the present invention, the term "locational information" of the radioactively labeled substances means to include a variety of information relating to the location of the radioactively labeled substances, or the aggregation thereof, being present in the sample, such as the location, the shape, the concentration, the distribution and combinations thereof.

DETAILED DESCRIPTION OF THE INVENTION

Figure 1:
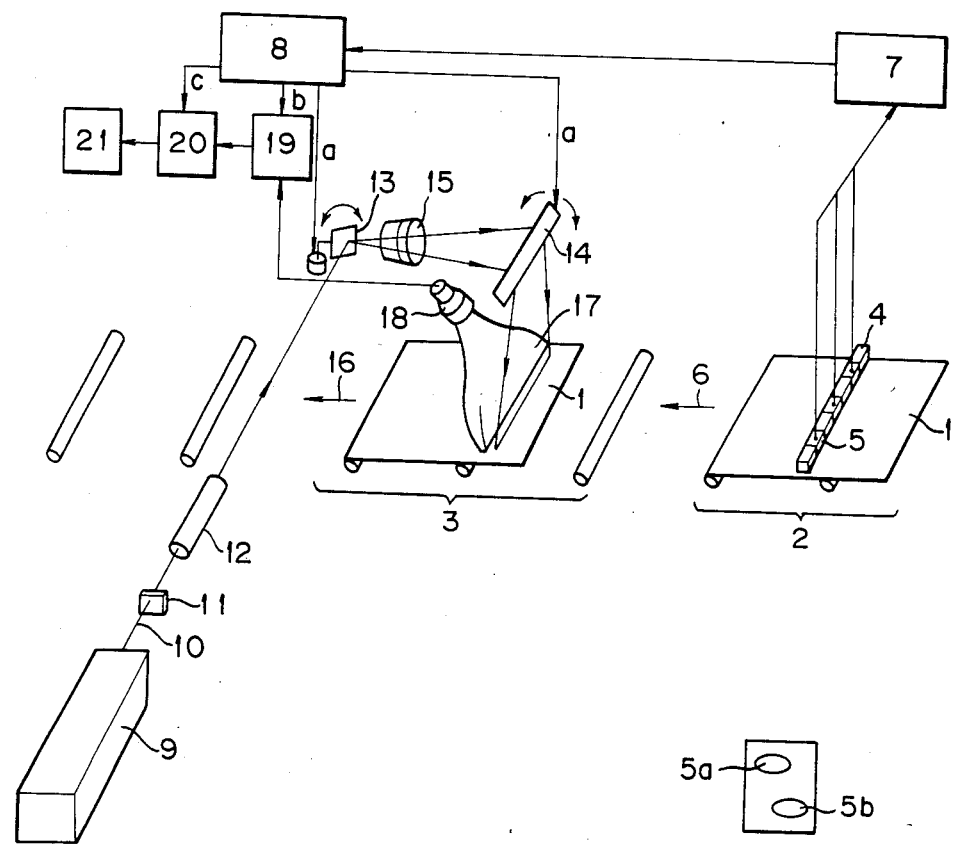
FIG. 1 shows an embodiment of the read-out system for reading out or detecting the locational information on the radioactively labeled substances in a sample stored and recorded on a stimulable phosphor sheet in accordance with the present invention.

According to the present invention, the period of time required for reading out the locational information can be shortened, by preliminarily scanning a stimulable phosphor sheet with an electromagnetic wave of low intensity to determine one-dimensional distribution direction of the radioactively labeled substances, and subsequently scanning the same stimulable phosphor sheet along said one-dimensional distribution direction with an electromagnetic wave to obtain the locational information on the radioactively labeled substances as a digital signal. More in detail, the read-out (scanning with an electromagnetic wave) of the stimulable phosphor sheet has not to be carried out over the entire surface of the stimulable phosphor sheet, but is carried out only in a certain area along the one-dimensional distribution direction of the radioactively labeled substances, so that the longer period of time which has been required in the conventional read-out operation is greatly shortened.

Further, it is not required to store the digital signal corresponding to the autoradiograph obtained by scanning the entire surface of the stimulable phosphor sheet in the memory of the signal processing circuit, which is different from the conventional read-out operation, but the digital signal only in a certain area along the one-dimensional distribution direction of the radioactively labeled substances, only namely the digital signal which provides the locational information on the radioactively labeled substances, can be stored in the memory, and accordingly the required memory capacity can be greatly reduced.

In order to obtain an electric signal and/or digital signal at a suitable level corresponding to the autoradiograph, the read-out operation ordinarily comprises: an initial read-out operation for mainly measuring the intensity of stimulated emission released from the stimulable phosphor sheet; and a final read-out operation for detecting the stimulated emission released from the stimulable phosphor sheet according to the condition having been set in the initial read-out operation so that an appropriate electric signal and/or digital signal can be obtained. In the signal detecting method of the present invention, the preliminary read-out operation for determining the one-dimensional distribution direction of the radioactively labeled substances further serves as the above-mentioned initial read-out operation for measuring the emission intensity, and this is also effective to shorten the read-out time.

Furthermore, according to the present invention, one-dimensional distribution (resolution) direction of the radioactive labeled substances on an autoradiograph can be detected automatically to determine a scanning direction for detection of the digital signal, even in the case that there occurs overall distortion or dislocation of the autoradiograph recorded on the stimulable phosphor sheet, which is brought about by locational distortion of a resolved row of the radioactively labeled substances on the support medium in the resolving procedure or by incorrect arrangement between the support medium carrying the resolved row of radioactively labeled substances thereon and the stimulable phosphor sheet in the storing and recording procedure of the autoradiograph thereof. Based on thus determined scanning direction, the information on one-dimensional location of the radioactively labeled substances can be obtained with a high accuracy. Further, in the case that the autoradiograph is composed of a plurality of resolved rows of the radioactively labeled substances distributed in one-dimensional direction, the distribution direction of every resolved row having the distortion can be accurately detected to determine a scanning direction for each row.

In the present invention, the term "one-dimensional distribution" means a pattern which comprises the radioactively labeled substances distributed in one direction in the form of a row of bands or spots, such as an electrophoretic row resolved through electrophoresis.

Examples of the sample employable in the present invention include a support medium on which radioactively labeled substances are distributed (e.g., resolved) in one-dimensional direction to form a distributed row (e.g., resolved row). Examples of the radioactively labeled substances include biopolymers, derivatives thereof, or cleavage products thereof, labeled with a radioactive substance.

For instance, in the case that the radioactively labeled biopolymers are polymeric substances such as protein and nucleic acid, derivatives thereof and cleavage products thereof, the present invention is useful for isolation and identification thereof. Further, the present invention can be effectively used to analyze the whole or partial molecular structures of these biopolymers and the basic segmental constitutions thereof. In particular, the present invention can be effectively used to determine the base sequence of nucleic acid such as DNA.

Representative examples of the method for resolving (or developing) the radioactively labeled substances on a support medium include an electrophoresis using one of various resolving mediums such as a gel in the form of layer, colum or the like, a molded polymer film such as a cellulose diacetate film, and a filter paper, and a thin layer chromatography using a support of material such as silica gel. However, the method employable in the present invention is by no means restricted to these methods.

Samples employable in the present invention are also by no means restricted to the above-mentioned samples, and any other samples can be used, provided that the sample is radioactively labeled substances distributed in at least one-dimensional direction and is capable of being recorded on a stimulable phosphor sheet in the form of an autoradiograph with the locational information thereof.

The stimulable phosphor sheet used in the present invention has a basic structure comprising a support, a phosphor layer and a transparent protective film. The phosphor layer comprises a binder and a stimulable phosphor dispersed therein, and for instance, it is obtained by dispersing particulate divalent europium activated barium fluorobromide (BaFBr:Eu$^{2+}$) phosphor in a mixture of nitrocellulose and linear polyester. The stimulable phosphor sheet is, for example, prepared by providing said phosphor layer onto the support such as a polyethylene terephthalate sheet and then providing a protective film such as a polyethylene terephthalate sheet on the phosphor layer.

In the exposing (storing and recording) procedure, that is, the procedure of storing radiation energy radiating from the support medium containing radioactively labeled substances in the stimulable phosphor sheet, at least a portion of the radiation energy is absorbed in the stimulable phosphor sheet by placing the support medium and stimulable phosphor sheet together in layers for a certain period of time. The exposure can be accomplished by keeping the phosphor sheet in a position adjacent to the support medium, for instance, at room temperature or a lower temperature for at least several seconds.

Detailed description of the stimulable phosphor sheet and the exposing procedure employable in the present invention is given in the aforementioned Japanese Patent Application No. 57(1982)-193418.

The signal detecting method according to the present invention for reading out the information on one-dimensional location of the radioactively labeled substances stored and recorded on the stimulable phosphor sheet and obtaining it in the form of a digital signal will be described in detail hereinafter, referring to an embodiment of a read-out system shown in FIG. 1 of the accompanying drawings and concerning an example of an autoradiograph obtained by resolving a mixture of radioactively labeled substances on a support medium through a resolving method such as electrophoresis.

Figure 2:
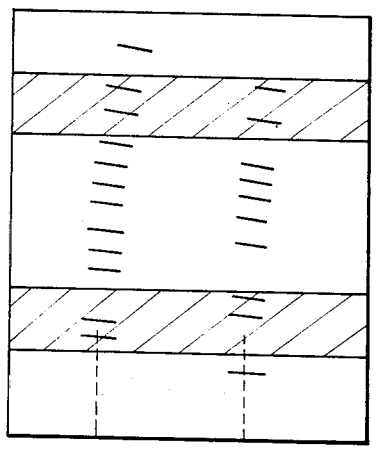
FIG. 2 shows an example of the autoradiograph of a sample comprising the radioactively labeled substances resolved on a support medium, which is stored and recorded on a stimulable phosphor sheet.

FIG. 1 schematically illustrates an embodiment of the read-out system comprising a preliminary read-out section 2 for determination of one-dimensional distribution direction of the radioactively labeled substances concerning the one-dimensional information thereof stored and recorded on the stimulable phosphor sheet 1 (the stimulable phosphor sheet is hereinafter referred to as "phosphor sheet"), and a final read-out section 3 for output of the locational information thereof, which has the function of reading out the autoradiograph (an example is shown in FIG. 2) recorded on the phosphor sheet.

FIG. 2 schematically illustrates an example of the autoradiograph of a sample recorded on the stimulable phosphor sheet, said sample being composed of plural kinds of the radioactively labeled substances which are resolved in the longitudinal direction on the support medium to form two resolved rows. The autoradiograph on the stimulable phosphor sheet shown in FIG. 2 is an example having a distortion due to the incorrect arrangement between the support medium and stimulable phosphor sheet in the exposing procedure, or the like.

In the preliminary read-out section 2, the preliminary read-out operation is carried out in the following manner.

Laser means generated by a sensor 4 impinges upon the phosphor sheet 1. The sensor 4 comprises a number of optical heads 5 and is positioned adjacent to the phosphor sheet 1. Each optical head 5 comprises a laser diode 5$a$ for generating laser beam and a photosensor 5$b$ for detecting stimulated emission released from the phosphor sheet 1 upon irradiation with the laser beam. A set of the laser diodes 5a and a set of the photosensors 5b are so arranged that the light-radiating faces of the laser diodes 5a and the light-receiving faces of the photosensors 5b are located in parallel with each other in the sensor 4. The sensor 4 is so arranged downwardly that the sensor 4 can be located in parallel with the stimulable phosphor sheet. The laser diode 5a used herein is so selected as to avoid overlappig of the wavelength region of the laser beam with the main wavelength region of the stimulated emission to be emitted from the phosphor sheet 1. The number of optical heads 5 coincides with the number of scanning for determination of the one-dimensional distribution direction of the radioactively labeled substances, and the sensor 4 has at least two of the optical heads.

The phosphor sheet 1 is transferred to the direction along the arrow 6 under the irradiation of the above-mentioned laser beam, where the phosphor sheet is so positioned that the transferring direction indicated by the arrow 6 is to traverse the one-dimensional distribution of the radioactively labeled substances stored and recorded on the phosphor sheet 1. Accordingly, when the phosphor sheet 1 is tranferred to the direction along the arrow 6, the laser beams whose number coincides with the number of optical heads 5 are simultaneously irradiated in parallel with each other on the phosphor sheet 1. The power of the laser diode 5a and the transferring speed of the phosphor sheet 1 are so adjusted that the intensity of the laser beam for preliminary read-out operation is less than that of the laser beam used in the final read-out operation. The laser beam generated by the laser diode 5a is employed at a sufficiently large beam size to perform the scanning with the laser beam with such a width as to catch at least one distributed portion of the radioactively labeled substances for each distributied row.

When irradiated with the above-mentioned laser beam, the phosphor sheet 1 gives the stimulated emission having the emission intensity proportional to the radiation energy stored (or recorded) therein, and the emitted light impinges upon the photosensor 5b of the sensor 4. The photosensor 5b, for instance, comprises a solid-state imaging device such as CCD, photomultiplier, etc. On the light-receiving face of the photosensor 5b is provided a filter which allows only the light in the wavelength region of the stimulated emission to pass through and cuts off the light of the wavelength region of the stimulating rays (laser beam) so as to detect only the stimulated emission. The stimulated emission detected by the photosensor 5b is converted into an electric signal, amplified in an amplifier 7, and transmitted to the output. The electric signal in the scanning area having been output from the amplifier is input to a control circuit 8 of the final read-out section 3. That is, the electric signal with respect to the hatched areas shown in FIG. 2 is input to the control circuit 8.

Figure 3:
FIG. 3 is a graph showing the intensity distribution of signal in the area of one scanning.

In the control circuit 8, the obtained electric signal is subjected to the signal processing, and thus the one-dimensional distribution direction of the radioactively labeled substances is determined. During the signal processing, the obtained electric signal is temporally stored in a memory (buffer memory) in the control circuit 8. The signal processing for determination of the one-dimensional distribution direction of the radioactively labeled substances, for instance, is carried out as follows: At first, the distribution of intensity of the signal in each scanning area is calculated along the scanning direction to obtain such an intensity distribution as shown in FIG. 3. Each peak appearing in the intensity distribution is then assigned to a distribution point of the radioactively labeled substances in each scanning area, and a straight line (or polygonal line) is prepared among the corresponding distribution points in each scanning area, to be assigned to the aimed one-dimensional distribution direction of the radioactively labeled substances. Further, the obtained polygonal line may be approximated with a suitable curved line so that the one-dimensional distribution direction can be determined more accurately.

In the case of obtaining the electric signal in a great number of scanning areas, the distribution points of the radioactively labeled substances may be detected for all the scanning areas in the same manner as mentioned above to prepare a polygonal line along the corresponding distribution points, but it is also possible to selectively find certain preferable scanning areas followed by performing the above-mentioned processing only with respect to these scanning areas in order to simplify the signal processing and shorten the processing time.

To determine the one-dimensional distribution direction of the radioactively labeled substances more accurately, the distance between each scanning area is preferably set as far as possible. When the one-dimensional distribution direction is determined using two scanning areas, it is desired to select such scanning areas as to be positioned at the top (or vicinity thereof) and the bottom (or vicinity theref) of the distributed row of the radioactively labeled substances.

Thus, the control circuit 8 output a scanning condition a of light beam such as a scanning position, direction thereof and width thereof for the final read-out operation, according to the determined one-dimensional distribution direction of the radioactively labeled substances.

In addition, the control circuit 8 outputs an amplification degree setting value b and scale factor setting value c according to the obtained stored and recorded information so that the signal of suitable level is obtained.

The phosphor sheet 1 having been subjected to the preliminary read-out operation in the above-mentioned manner is then transferred to the final read-out section 3.

In the final read-out section 3, the following readout operation is performed.

Laser beam 10 generated by a laser source 9 for the final read-out passes through a filter 11 to cut off a light beam in the wavelength region corresponding to the wavelength region of the stimulated emission to be emitted from the phosphor sheet 1 in response to stimulation with the laser beam, and subsequently the diameter of the laser beam is precisely adjusted in a beam expander 12. Then, the laser beam 10 is deflected by a movable beam deflector 13 such as a galvanometer mirror which is set on its deflection according to the above-mentioned light beam scanning condition a, and reflected by a movable plane reflection mirror 14 which is also adjusted according to the scanning condition a. The deflected beam impinges one-dimensionally upon the phosphor sheet 1. The movable beam deflector 13 and movable plane reflection mirror 14 should be continually adjusted according to the scanning condition a output from the control circuit 8. Between the movable beam deflector 13 and the movable plane reflection mirror 14, a f$\theta$ lens 15 is provided so that the beam speed can be kept constant while the deflected laser beam is scanned on the phosphor sheet 1.

The phosphor sheet 1 is transferred in the direction along the arrow 16 under the irradiation with the above-mentioned deflected beam. The transferring speed of the phosphor sheet 1 is so adjusted as to coincide timely with the output of the scanning condition a from the control circuit 8. Consequently, the deflected beam is irradiated on the phosphor sheet 1 with a certain width along the one-dimensional distribution direction of the radioactively labeled substances.

When irradiated with the above-mentioned laser beam, the phosphor sheet 1 gives the stimulated emission in proportion to the radiation energy stored therein in the same manner as in the preliminary read-out operation, and the emission enters a light guiding sheet 17. The light guiding sheet 17 is made, for instance, by processing a sheet of a transparent thermoplastic resin such as an acrylic synthetic resin, and so constituted that the emission introduced from its linear edge face is transmitted to the exit under repeated total reflection within the sheet 17. The stimulated emission from the phosphor sheet 1 is guided in the interior of the light guiding sheet 17 to the exit and received by the light detector 18. On the light-receiving face of the light detector 18 is provided a filter which allows only the light in wavelength region of the stimulated emission to pass through and cuts off the light in the wavelength region of the stimulating rays (laser beam) so as to detect the stimulated emission only.

The stimulated emission detected by the light detector 18 is converted to an electric signal, amplified to an electric signal adjusted to an appropriate level in an amplifier 19 according to the aforementioned amplification degree setting value b, and transmitted to an A/D converter 20. The adjusted electric signal is then converted to a digital signal in the A/D converter 20 according to an appropriate scale facter defined by the scale factor setting value c.

In the above description on the method for reading out the locational information on the radioactively labeled substances stored and recorded on the stimulable phosphor sheet according to the present invention, the final read-out operation wherein the scanning direction of the laser beam is straight has been given, but the read-out operation according to the invention is not limited to the above-mentioned embodiment. In the case that the distribution direction of the radioactively labeled substances is approximated with a polygonal line or a curved line, it is also possible to perform the scanning of the light beam in such a manner that the scanning direction varies coincidently with the distribution direction.

Further, the above-described method has been described referring to the read-out system comprising a preliminary read-out section and final read-out section, but the read-out system employable in the present invention is not limited to that read-out system. For instance, it is possible to eliminate the preliminary readout section and to perform in the same optical device both the preliminary scanning with the laser beam for determining the one-dimensional distribution direction of the radioactively labeled substances and the final scanning therewith for reading out the location information along the determined distribution direction.

It is also possible that the spot diameter of light beam in the final read-out operation is set according to the light beam scanning condition output from the control circuit. By setting the spot diameter of light beam to a suitable scanning width, the final read-out operation is more simplified. This simplification enables elimination of numeral scanning on the digital image data when the obtained digital signal is subjected to a signal processing, because only the signal having the locational information is obtained, that is, the signal processing for obtaining the locational information can be also simplified.

Thus detected digital signal having the locational information on the radioactively labeled substances is input to a signal processing circuit 21, in which various signal processings are applied thereto to obtain the desired information in the form of symbol and/or numeral.

More in detail, through the processing, sampling points for detecting distributed portions of the radioactively labeled substances are determined based on the obtained digital signal. In the case that a plurality of distributed rows in the one-dimensional direction are concerned, the determined sampling points are compared and identified between corresponding positions on each distributed row, and thus the information on one-dimensional location of the radioactively labeled substances can be obtained as symbol and/or numeral.

Since the digital signal obtained according to the present invention is input for individual distributed rows, the determination of scanning direction (one-dimensional distribution direction) for detecting the sampling points is not required on the digital image data.

In addition, the amount of digital signal to be stored in the memory (buffer memory or non-volatile memory such as magnetic disk) in the signal processing circuit 21 can be decreased greatly, because the signal produced only from a certain area along the distribution direction of the stimulable phosphor sheet is detected.

In the above-mentioned example shown in FIG. 2 and FIG. 3, the case of two distributed rows of the radioactively labeled substances has been described, but the signal detecting method of the present invention is not limited to this case and also applicable to any cases wherein the distributed row such as a resolved row is single or plural such as three or more.

The signal processing to determine the one-dimensional distribution direction of the radioactively labeled substances in the control circuit is not limited to the above-mentioned one, but for instance, the same processing as the digital signal processing described in the aforementioned Japanese Patent Application No. 57(1982)-1328 can be employed.

By employing the signal detecting method of the present invention for obtaining the locational information on the radioactively labeled substances distributed in one-dimensional direction, the width (spot size) of individual distributed portion thereof can be reduced to approximately 3 mm, because initially the one-dimensional distribution direction thereof is determined and the signal is then detected along the distribution direction. Consequently, the amount of radioactively labeled substances per a resolved row can be decreased and the number of resolvable rows per a support medium can be increased. In other words, more information can be obtained in a single autoradiographic process than that in the conventional autoradiographic process.

The signal detecting method in autoradiography of the present invention is very useful, for instance, for determination of the base sequence of DNA or DNA fragment utilizing autoradiography such as Maxam-Gilbert method. In Maxam-Gilbert method, DNA or DNA fragment labeled with a radioactive element is base-specifically cleaved for each base unit concerning the four bases of constitutional units, the mixture of base-specifically cleavage products is resolved and developed by electrophoresis to obtain an autoradiograph, and then the base sequence of DNA or DNA fragment is determined from the obtained autoradiograph. By applying the signal detecting method of the present invention to the Maxam-Gilbert method, the resolved (developed) direction can be detected based on the electric signal and assigned to the scanning direction independently of the combination of base-specific cleavage products. Thus, the digital signal having the locational information on DNA bases can be obtained along the scanning direction.

We claim:

1. A signal detecting method in autoradiography, which is applied to an autoradiograph having locational information on radioactively labeled substances distributed one-dimensionally, being recorded on a stimulable phosphor sheet as a radiation energy-stored image, which comprises steps of:

(1) scanning the stimulable phosphor sheet with an electromagnetic wave in at least two different positions in such a manner that each scanning traverses the one-dimensional distribution of the radioactively labeled substances to release a portion of the radiation energy of the autoradiograph as stimulated emission and photoelectrically detecting the stimulated emission to give an electric signal, to which is applied a signal processing comprising stages of:

detecting distribution points of the radioactively labeled substances for each scanning, and preparing a continuous line selected from the group consisting of a straight line, a polygonal line and a curved line along the corresponding distribution points of the radioactively labeled substances for each scanning, to assign said continuous line to one-dimensional distribution direction of the radioactively labeled substances; and (2) scanning the stimulable phosphor sheet with an electromagnetic wave along said one-dimensional distribution direction of the radioactively labeled substances determined in the step (1) to release the radiation energy of the autoradiograph as stimulated emission and photoelectrically detecting the stimulated emission, to obtain the locational information on the radioactively labeled substances indicated by said autoradiograph as a digital signal.

2. The signal detecting method in autoradiography as claimed in claim 1, wherein said scanning with the electromagnetic wave in the step (1) is carried out on the stimulable phosphor sheet in at least two different positions in such a manner that the scannings traversing the one-dimensional distribution of the radioactively labeled substances are made in parallel with each other.

3. The signal detecting method in autoradiography as claimed in claim 1, wherein said step (1) comprises:

scanning the stimulable phosphor sheet with an electromagnetic wave in two different positions to obtain an electric signal, to which is applied a signal processing comprising stages of:

detecting distribution points of the radioactively labeled substances in two positions, and preparing a straight line between these two distribution points, to assign said line to a one-dimensional distribution direction of the radioactively labeled substances.

4. The signal detecting method in autoradiography as claimed in claim 1, wherein the position and width of said scanning on the stimulable phosphor sheet with the electromgnetic wave in the step (1) are so set prior to the signal detecting as to match with the conditions of the one-dimensional distribution of the radioactively labeled substances under analysis.

5. The signal detecting method in autoradiography as claimed in claim 1, wherein the position and width of said scanning on the stimulable phosphor sheet with the electromagnetic wave in the step (2) are determined in the step (1).

6. The signal detecting method in autoradiography as claimed in claim 1, wherein said one-dimensionally distributed radioactively labelled substances are biopolymers, derivatives thereof or cleavage products thereof, labelled with a radioactive element and resolved in one-dimensional direction on the support medium.

7. The signal detecting method in autoradiography as claimed in claim 6, wherein said bio-polymers are nucleic acids, derivatives thereof, or cleavage products thereof.

* * * * *